United States Patent [19]

Melchior et al.

[11] 4,432,206

[45] Feb. 21, 1984

[54] SUPERCHARGED INTERNAL COMBUSTION ENGINES, IN PARTICULAR DIESEL ENGINES, AND IN METHODS FOR STARTING UP AND REGULATING THE SPEED OF THESE ENGINES

[75] Inventors: Jean F. Melchior, Neuilly-sur-Seine; Thierry M. Andre, Paris, both of France

[73] Assignee: The French State, Paris, France

[21] Appl. No.: 481,267

[22] Filed: Apr. 4, 1983

Related U.S. Application Data

[63] Continuation of Ser. No. 272,292, Jun. 10, 1981, abandoned.

[30] Foreign Application Priority Data

Jun. 17, 1980 [FR] France ................ 80 13402

[51] Int. Cl.³ .............................................. F02B 33/44
[52] U.S. Cl. .......................................... 60/606; 60/612
[58] Field of Search ................... 60/602, 606, 612; 123/562

[56] References Cited

U.S. PATENT DOCUMENTS

| | | | |
|---|---|---|---|
| 2,173,595 | 9/1939 | Schutte | 60/612 |
| 2,359,615 | 10/1944 | Browne | 60/602 |
| 2,380,777 | 7/1945 | Moss | 60/612 |
| 3,423,927 | 1/1969 | Scherenberg | 60/606 |
| 4,026,115 | 5/1977 | Melchior | 60/606 |
| 4,228,655 | 10/1980 | Herchmann | 60/612 |

Primary Examiner—Douglas Hart
Attorney, Agent, or Firm—Barnes, Kisselle, Raisch, Choate, Whittemore & Hulbert

[57] ABSTRACT

The engine is supercharged by two turbocharger units which are capable of being put into operation in succession and their compressors are capable of supplying air to the engine in parallel. When the turbocharger unit is not in operation, the outlet of its compressor is put in communication through a bypass passage with the inlet of its turbine by means of flaps or the like.

24 Claims, 6 Drawing Figures

Fig. 5

SUPERCHARGED INTERNAL COMBUSTION ENGINES, IN PARTICULAR DIESEL ENGINES, AND IN METHODS FOR STARTING UP AND REGULATING THE SPEED OF THESE ENGINES

This is a continuation of prior co-pending application Ser. No. 272,292, filed June 10, 1981, now abandoned.

DESCRIPTION

The invention relates to supercharged internal combustion engines and more particularly to supercharged diesel engines and still more particularly, among the latter, to four-stroke engines and engines having a relatively low compression ratio comprising, on one hand, at least two compressors the outlets of which are capable of being connected in parallel by a common connection passage to the air intake of the engine and turbines each of which mechanically drives one of the compressors by forming therewith a turbocharger unit the inlets of which are capable of being connected in parallel by a common transfer passage to the exhaust of the engine and, on the other hand, means which are responsive to a parameter of operation of the engine representing the ratio between the air flow through the engine and the total air flow discharged by the compressors and are arranged to interrupt or ensure a communication between, on one hand, the outlet of the compressor of one of the turbocharger units and the connection passage and, on the other hand, the inlet of the turbine of the same unit and the transfer passage in accordance with the value of said parameter of operation.

There may be chosen as the parameter of operation for example the pressure of the supercharging air or the flow of fuel injected per cycle in the engine (position of the rack of the fuel injection pump of the engine) or the running speed of the engine for a four-stroke engine or the mass flow of air through the engine for a two-stroke engine.

Among said engines, the invention, more particularly, but not exclusively, relates to those in which a branch passage provided with an auxiliary combustion chamber connects the common connection passage to the common transfer passage and bypasses the engine.

Such an engine is disclosed in French patent application No. 2,322,266, which was available to the public on Mar. 26, 1977, and in a counterpart U.S. Pat. No. 4,228,655.

It is known that, when it is unique, the turbocharger unit of a supercharged engine, with or without a bypass passage for connecting the outlet of the compressor to the inlet of the turbine of the unit by bypassing in this way the engine, is so designed and adapted as to deliver at least the maximum air flow through the engine. In a four-stroke engine, this flow is maximum at the maximum speed of the engine. When the engine has a bypass passage, the compressor directly sends to the turbine the excess air flow which does not pass through the engine. This excess air flow is of course maximum when the engine runs at its minimum speed or, a fortiori, when the engine is not operating and the auxiliary combustion chamber is operating. The excess air flow dilutes the exhaust gases of the engine and therefore lowers the temperature of the gases at the inlet of the turbine: if this temperature becomes excessively low, the energy of the last-mentioned gases is then excessively low and the turbine rotates too slowly or stops; the engine is then no longer sufficiently supercharged and operates incorrectly (emission of smoke in the exhaust, etc.). If its volumetric ratio is relatively low, it may even stall.

In order to ensure that such an incident does not occur, the supercharging pressure must be maintained above a certain threshhold value which is related to that of the volumetric ratio of the engine and it is well for this purpose to heat the gases which enter the turbine. This heating is effected by the auxiliary combustion chamber which receives the air circulating in the bypass passage and which can burn an additional amount of fuel. However, the consumption of this additional amount of fuel penalizes the engine when it operates at low speed.

This penalization is particularly great in respect of engines which must operate at low speed over long periods. This is in particular the case of engines which drive high-performance ships. In order to propel a ship at 35 knots (which does not occur frequently) there is for example employed an engine which develops 4000 kW at 1600 rpm and consumes 980 kg of fuel per hour under these conditions. When cruising at 16 knots (which is much more frequent) this ship requires a power of 382 kW at 731 rpm. Under these conditions, the engine consumes 99 kg of fuel per hour. But if this engine has a low volumetric ratio (for example 7), its supercharging pressure must be maintained above a certain threshold value by burning around 40 kg of fuel per hour in the auxiliary combustion chamber. Consequently, the total hourly consumption of the engine, i.e. including that of said chamber, is greater by about one third than that of an engine which has the same power but a higher volumetric ratio (12), which correspondingly reduces the autonomy or range of this ship at cruising speed.

In order to avoid these drawbacks, it is desirable to adjust the air flow of the supercharging means to the air flow through the engine. In the case where the engine is provided with a bypass passage, the excess air which returns to the inlet of the turbine through the bypass passage is thus minimized and this permits reducing or even eliminating the additional fuel flow which is burnt in the auxiliary combustion chamber.

In the aforementioned French patent application No. 2,322,266, it was proposed for this purpose to connect in parallel a plurality of turbocharger units, for example four units. A stop valve mounted at the inlet of the turbine of each turbocharger and a stop valve mounted at the outlet of the compressor of the same unit are actuated by means responsive to the speed of the engine. In this way, it is possible to bring into operation a more or less large number of turbocharger units, the stop valve mounted at the inlet of each turbine being opened as quickly as possible but closed slowly. Further, the connection of a unit is effected at a higher engine speed than the disconnection of the same unit. Such an engine is complicated, since it comprises a rather large number of turbocharger units operating in parallel and stop valves associated with these units and the control of the stop valves must be modulated in accordance with the opening or closing thereof. Further, even relatively slow, the operation for closing the stop valve mounted at the inlet of each turbine is liable to cause the point of operation of the compressor associated with this turbine to enter the hunting zone. In order to still further attenuate these hunting phenomena which are known to be dangerous for the compressors, some constructors at present propose increasing beyond four the number of turbocharger units capable of being put successively into operation, which still further complicates the engine and correspondingly increases the risks of operational incidents.

An object of the invention is to so arrange the engines of the type defined in the preamble that they are capable of operating within a wide range of speeds with a total hourly consumption which remains reasonable regardless of the conditions of operation, with no marked complication and no risk of the hunting phenomena in respect of their supercharging compressors in transitional operation.

For this purpose, the internal combustion engine of the aforementioned type is characterised according to the invention in that said means responsive to a parameter of operation of the engine are so arranged that, at the same time as they interrupt said communication between the outlet of the compressor of one unit and the inlet of the turbine of the same unit, they directly connect through a bypass the outlet of said compressor to the inlet of the turbine of the unit and that, inversely, at the same time as they ensure said communication, they interrupt the bypass between the outlet of said compressor and the inlet of said turbine.

In this way, when a turbocharger unit is put out of operation, it continues to rotate by the effect of its momentum and gradually slows down, the air discharged by the compressor of this unit being deviated by the bypass to the turbine of the same unit. Moreover, there is no risk of the air which is discharged by the other compressor or compressors still in operation and is present in the connection passage, disturbing the flow in the compressor thus put out of operation. Any hunting phenomenon is thus avoided in this last-mentioned compressor.

In a preferred embodiment of the invention, the engine comprises only two turbocharger units which are usually identical and may be of one or two stages with or without an intermediate cooling. This enables the engine and its auxiliary equipment to be simplified and consequently reduces the risks of an operational incident. In this case, said means responsive to a parameter of operation of the engine may be provided only on one of the two turbocharger units. For safety reasons, such means may however be mounted symmetrically on both units, which enables the engine to be started up even if one of the two units breaks down.

In the case where the engine comprises a bypass passage, the invention is of particular interest when the bypass passage is divided into two main branches the first of which leads to the dilution zone or "secondary zone" which is downstream of the upstream part or "primary zone" of the auxiliary combustion chamber and is provided with first throttle means defining a variable passage section, whereas the second branch extends from a region of the first branch located upstream of the first throttle means and opens into the primary zone through a second throttle means, the first throttle means being arranged in such manner as to create a pressure drop which is substantially independent of the ratio between the air flow in the bypass passage and the total air flow discharged by the compressor or compressors but which varies in the same direction as the pressure prevailing upstream of the first throttle means, means being provided for correlatively varying the flow of the fuel and the flow of the air introduced in the primary zone.

In this way, the same auxiliary combustion chamber and the same throttle means may act in combination with a single turbocharger unit or with two of such units.

A particularly simple solution is provided by incorporating in said means responsive to a parameter of operation of the engine four-way directional valve means between the outlet of the compressor of the aforementioned unit, the inlet of the turbine of the same unit, the connection passage and the transfer passage.

When said parameter of operation of the engine is formed by the speed of the latter, the means responsive to the speed of the engine are preferably so arranged as to act approximately at the same speed threshold of the engine and as rapidly as possible both when they interrupt and ensure said communication. This considerably simplifies the control system of these means.

In a particularly judicious construction, the means responsive to the parameter of operation of the engine are combined with a starter system preferably employing a compressed air jet associated with that one of the turbocharger units wich is capable of being put out of operation so as to bring this starter system into operation before ensuring the communication between, on one hand, the outlet of the compressor of this unit and the connection passage and, on the other hand, the inlet of the turbine of the same unit and the transfer passage. This construction facilitates the operation in transitions between operation at moderate speed and operation at high speed.

Another object of the invention is to provide a method for starting up and regulating the speed of a supercharged internal combustion engine and more particularly a supercharged diesel engine, comprising at least two compressors whose outlets are capable of being connected in parallel through a common connection passage to the intake of the engine and to a bypass passage provided with an auxiliary combustion chamber, and turbines each of which turbines mechanically drives one of the compressors by forming therewith a turbocharger unit the inlets of the turbines being capable of being connected in parallel through a common transfer passage to the exhaust of the engine and to the outlet of the auxiliary combustion chamber, said method comprising, for starting up the engine, starting up the first of the turbocharger units after having by-passed the other unit or units by connecting the outlet of the compressor or compressors of said other unit or units to the inlet of its turbine at the same time as the fuel is sent to and ignited in the auxiliary combustion chamber in an amount which is sufficient to ensure the autonomy of the first unit at a discharge pressure of its compressor which is sufficient to start up the engine having regard to the volumetric ratio of the latter;

then starting up the engine and accelerating it until the ratio between the air flow through the engine and the total air flow discharged by the compressors reaches a ratio threshold of given value;

then, from the moment when said ratio threshold value is reached and exceeded during a minimum lapse of time, starting up a second turbocharger unit and, as soon as its speed of rotation or its discharge pressure reaches a first given threshold of operation, reestablishing the normal communications of said second turbocharger unit and charging the engine;

then successively starting up the other units, if any, with reestablishment of the normal communications at successive threshholds of operation;

then, when the threshold of operation previously exceeded is passed through in the opposite direction, bypassing as rapidly as possible the last one of the turbocharger units started up and allowing the engine to operate supercharged by the other unit or units, and so on for putting one of the units out of operation or in operation.

In the case where the bypass passage is divided into two main branches, the first of which leads to a dilution zone or "secondary zone" downstream of the upstream part or "primary zone" of the auxiliary combustion chamber and is provided with first throttle means defining a variable passage section whereas the second branch extends from a region of the first branch located upstream of the first throttle means and opens into the primary zone through second passage throttling means, the first throttle means being arranged in such manner as to create a pressure drop which is substantially independent of the ratio between the air flow in the bypass passage and the total air flow discharged by the compressor or compressors but which varies in the same direction as the pressure prevailing upstream of the first throttle means, said method may moreover have the feature that, each time a turbocharger unit is started up, the first throttle means are made to occupy temporarily their fully open position.

The invention will now be described in more detail with reference to the accompanying diagrammatic drawings.

Figure 1:
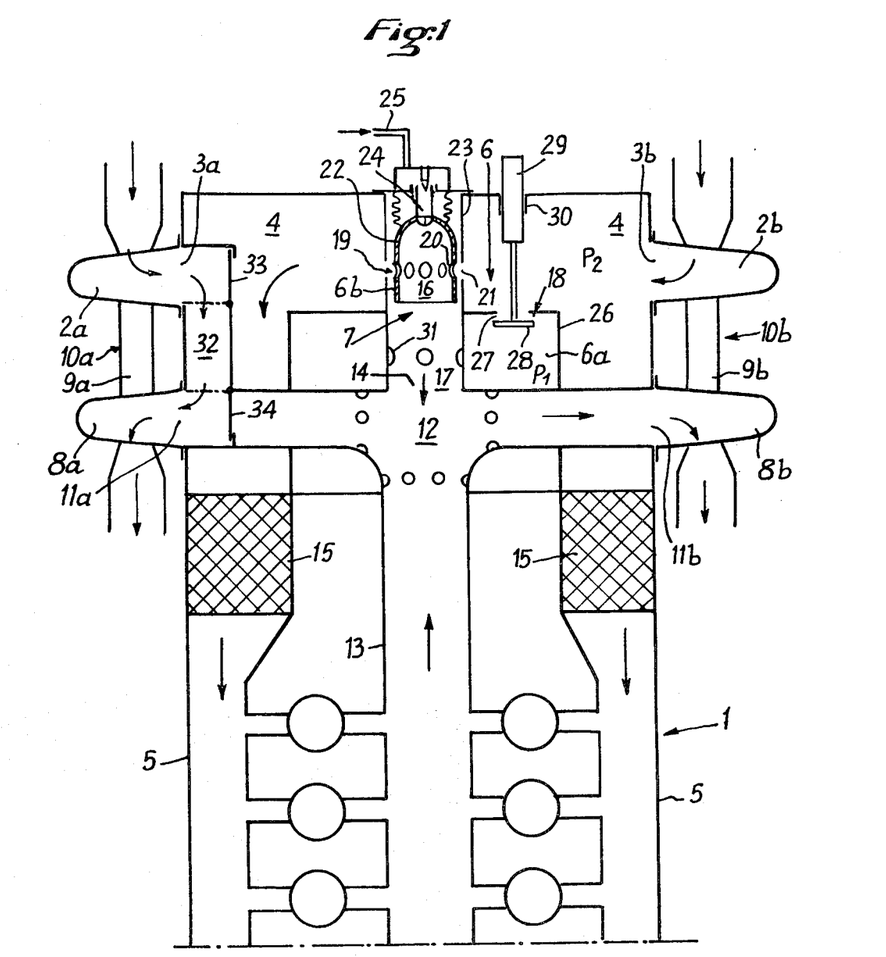
FIGS. 1 and 2 of these drawings show the essential elements of an engine according to the invention in the positions they occupy when the engine is running at a relatively low speed and relatively high speed respectively.
Figure 2:
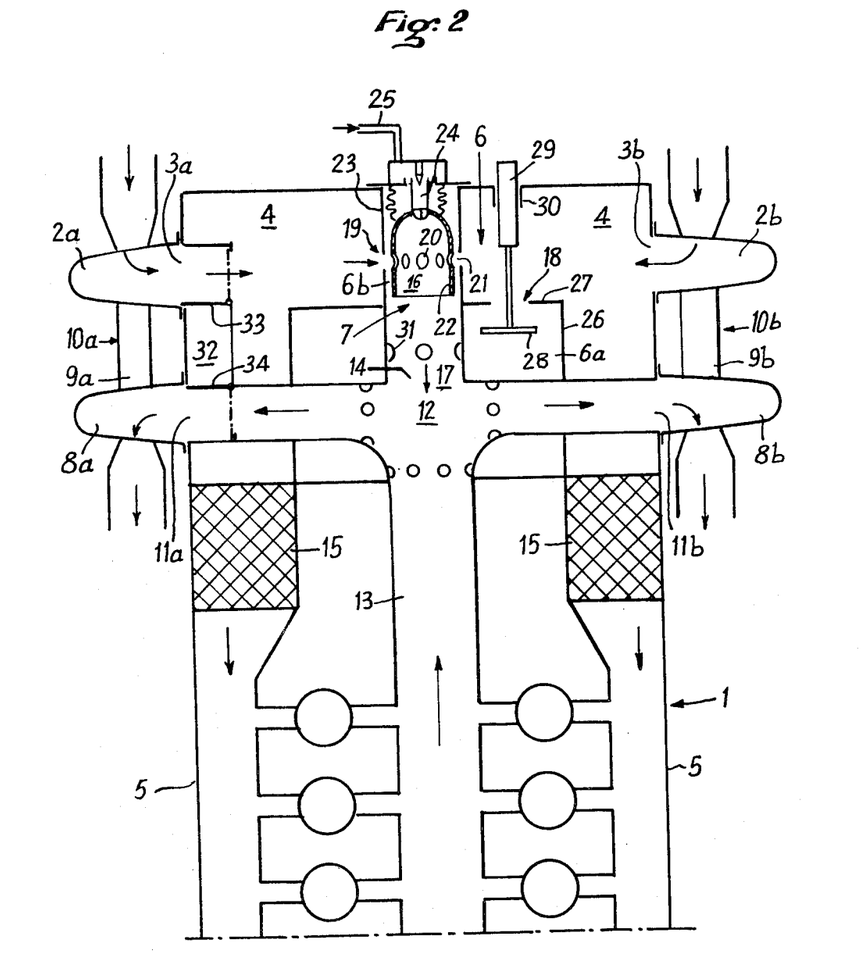

The supercharged diesel engine 1 shown in FIGS. 1 and 2 comprises:

two compressors 2a and 2b whose outlets 3a and 3b are capable of being connected, through a common connection passage 4, to an intake manifold 5 (single or double) of the engine 1 and preferably also to a bypass passage provided with an auxiliary combustion chamber 7.

two turbines 8a and 8b, each of which mechanically drives, for example by means of a common shaft 9a or 9b, one of the compressors 2a or 2b, by forming therewith a turbocharger unit 10a or 10b whose inlets 11a and 11b are capable of being connected, through a common transfer passage 12, to the exhaust manifold 13 (single or double) of the engine 1 and to the outlet 14 of the auxiliary combustion chamber 7, and means (not shown) which are responsive to the speed of the engine 1 and are arranged to interrupt or ensure a communication, on one hand, between the outlet 3a of the compressor 2a of the unit 10a and the connection passage 4 and, on the other hand, between the inlet 11a of the turbine 8a of the same unit 10a and the transfer passage 12, depending on whether the speed of the engine 1 is lower or higher. A supercharging air cooler 15 is usually disposed upstream of the intake manifold 5.

The means responsive to the speed of the engine may be formed by any tachometric system, such as a governor having balls, or a tachometric dynamo or a device responsive to an oil pressure downstream of a gear pump.

The auxiliary combustion chamber 11 is preferably arranged in accordance with the teaching of French patent application No. 79 31038 of Dec. 19, 1979 (not yet published). This chamber 7 is divided, in the direction from the upstream to the downstream side, into a primary zone 16 and a secondary or dilution zone 17. The bypass passage 6 is divided into two main branches 6a and 6b. The first branch 6a leads to the secondary zone 17 and is provided with first throttle means 18 defining a variable passage section. The second branch 6b extends from a region of the first branch 6a located upstream of the first throttle means 18 and opens into the primary zone 16 through second passage throttle means 19. The second throttle means 19 comprise combined orifices 20 and 21 respectively provided in an inner cylindrical sleeve 22 which at least partly defines the primary zone 16 and an outer sleeve 23 which at least partly defines the connection passage 4. At least one fuel injector 24 opens into the primary zone 16 in the immediate vicinity of the combined throttle orifices 20,21 and receives liquid fuel through a pipe 25. Means correlatively vary the flow of the fuel injector or injectors 24 and, by a relative displacement of the sleeves 22 and 23, the air flow entering the primary zone 16 through the common free section of the combined orifices 20,21.

The first branch 6a of the bypass passage 6 is defined by a box structure 26 provided with an aperture whose edge forms a seat 27 with which cooperates a closing valve disc 28 located downstream of this seat. The disc 28 is connected to an equilibrating piston 29 which extends through the seat 27 and through the wall of the connection passage 4 with interposition of sealing means 30. The disc 28 with the piston 29 constitutes the first throttle means 18 and is in equilibrium under the effect of a reference pressure $P_0$ which is exerted on the section of the piston 29 in the upper or outer part of the latter, and the pressure prevailing upstream (pressure $P_2$) and downstream (pressure $P_7$) of the closing valve disc 28 which are exerted respectively on the upper side and lower side of the disc 28. If s is the section of the piston 29 and S the section of the disc 28, the conditions of equilibrium of the disc 28 and piston 29 are expressed by the following relation:

$$(P_2-P_7)/(P_2-P_0)=(s/S) \qquad (I).$$

Thus it can be seen that the first throttle means 18 comprising the disc 28 are capable of creating a pressure drop $P_2-P_7$ which is substantially independent of the ratio between the air flow in the bypass pipe 6 and the total air flow discharged by the compressors 2a,2b but which varies in the same direction as the pressure $P_2$ prevailing upstream of these first throttle means 18.

The branch 6a of the bypass passage 6 is connected to the branch 6b in the region of the secondary zone 17 by way of orifices 31 so that the air entering by way of these orifices dilutes the combustion gases coming from the primary zone 16.

The exhaust manifold 13 and the secondary zone 17 of the combustion chamber 7 both lead to the aforementioned transfer passage 12.

In order to correlatively vary the flow of fuel introduced by the injector or injectors 24 and the flow of air introduced by the combined orifices, known arrangements are employed such as those disclosed in said French patent application No. 79 31038 or in the U.S. Pat. No. 4,026,115.

In this way there is obtained an internal combustion engine the general operation of which will be recalled hereinafter, in assuming that both compressors 2a,2b operate.

The air discharged by the compressors 2a,2b is divided into two streams: the air which passes through the engine 1 and the complementary stream which reaches the turbines 8a,8b through the bypass passage 6. This complementary stream is again divided into two streams: a first part which supplies air to the primary zone 16 through the combined orifices 20,21 in a preferably stoichiometric proportion with the fuel introduced by the injector or injectors 24, and the second part which enters the secondary zone 17 through the orifices 31, this second part of the complementary stream having previously passed through the first throttle means 18 and diluting the very hot combustion gases issuing from the primary zone 16. When the engine 1 accelerates, the air flow therethrough increases and the complementary stream flow decreases in the bypass passage 6. The first throttle means 18 therefore gradually close and gradually decrease the air flow entering the secondary zone 17. The air entering the primary zone 16, whose flow depends only on the pressure and consequently on the load of the engine 1 (and not on the speed of the latter), continues to ensure the combustion in this primary zone 16 under conditions which are as close as possible to stoichiometric conditions.

This having been said, according to the invention, said means responsive to the speed of the engine 1 are so arranged that, at the same time as they interrupt the communication, on one hand, between the outlet 3a of the compressor 2a of the unit 10a and the connection passage 4 and, on the other hand, between the inlet 11a of the turbine 8a of the same unit 10a and the transfer passage 12, they connect through a bypass 32 the outlet 3a of this compressor 2a to the inlet 11a of the turbine 8a (FIG. 1). Inversely, said means responsive to the speed of the engine 1 are so arranged that, at the same time as they ensure the communication between, on one hand, the outlet 3a of the compressor 2a and the connection passage 4 and, on the other hand, between the inlet 11a of the turbine 8a and the transfer passage 12, they interrupt the bypass 32 between the outlet 3a of the compressor 2a and the inlet 11a of the turbine 8a (FIG. 2).

Figure 3:
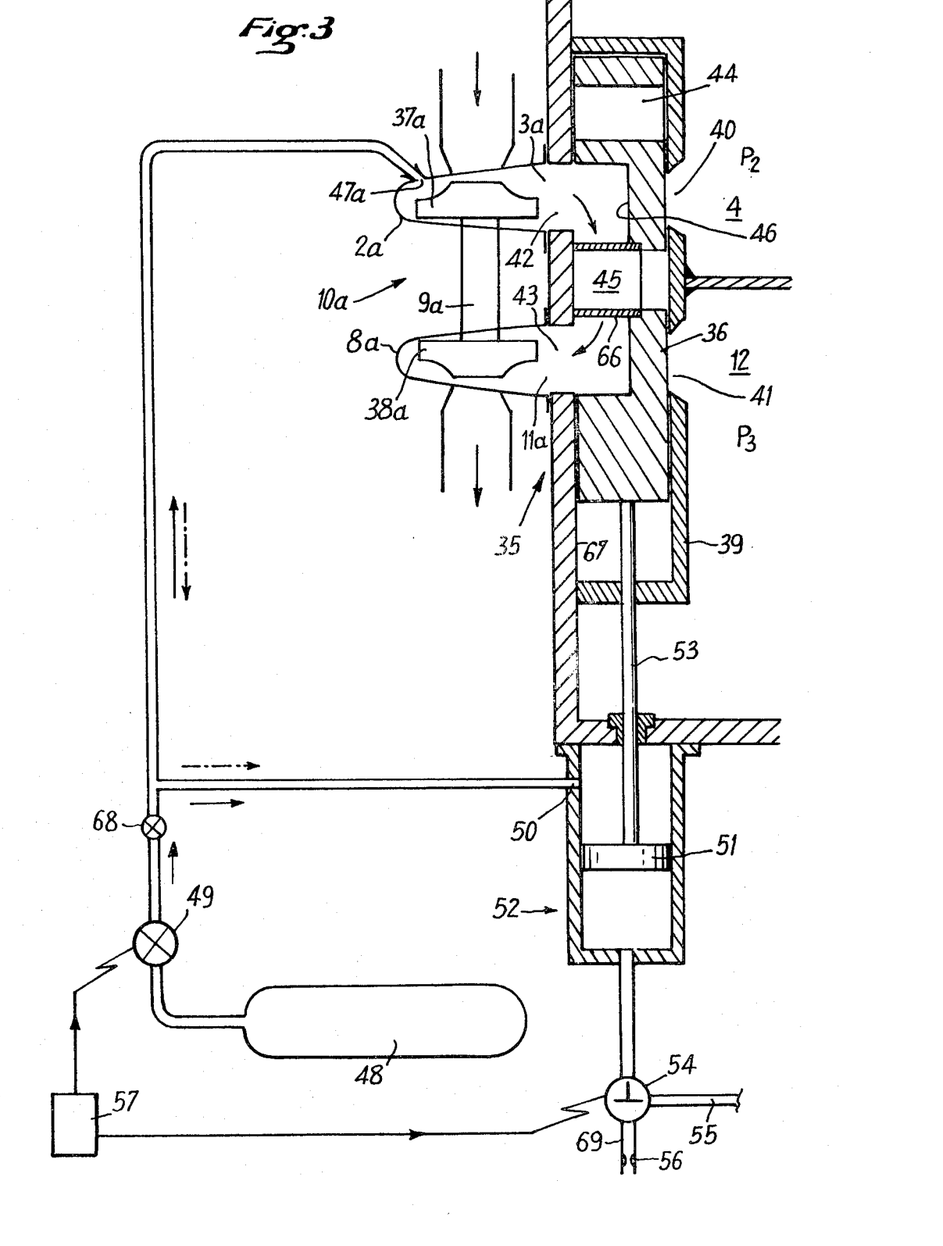
FIG. 3 represents an oleopneumatic control system for the engine of FIGS. 1 and 2 in a position corresponding to that of FIG. 1.
Figure 4:
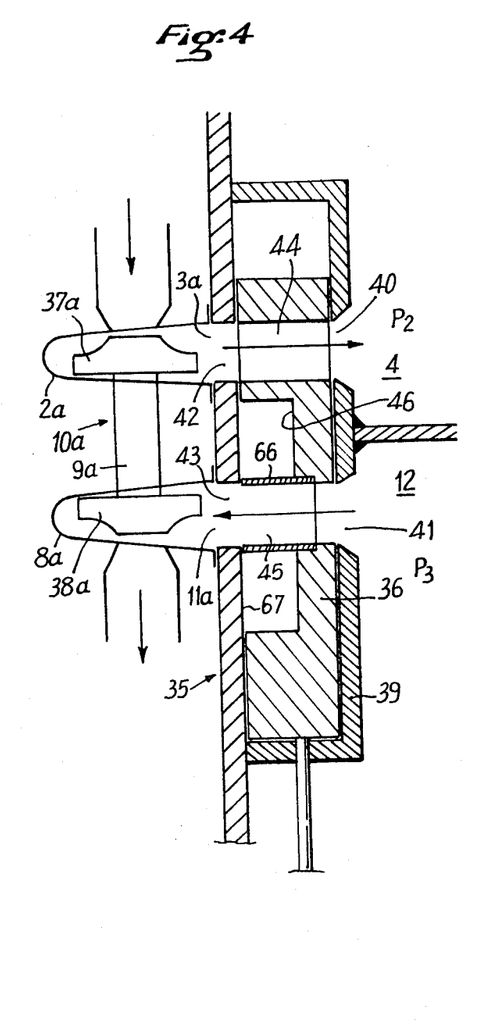
FIG. 4 represents an extract of FIG. 3 in a position corresponding to that of FIG. 2.

As shown diagrammatically in FIGS. 1 and 2, said means responsive to the speed of the engine 1 may comprise either two three-way valves 33 and 34, for example formed by pivotal flaps respectively mounted on the outlet 3a of the compressor 2a and on the inlet 11a of the turbine 8a, or, more advantageously, a four-way directional valve 35 which is illustrated (to an enlarged scale relative to the turbocharger unit) in FIGS. 3 and 4, said valves 33,34 or this directional valve 35 being actuated as a function of the speed of the engine 1, as will be explained hereinafter.

According to the embodiment shown in FIGS. 3 and 4, it was assumed that the four-way directional valve 35 was of the sliding spool type 36 but it will be understood that an equivalent directional valve having a rotary dome could be used instead. In FIGS. 3 and 4 there are shown the elements 2a,3a,4a,8a,9a,10a,11a and 12 of FIGS. 1 and 2, which consequently need not be described again. Shown at 37a and 38a are the rotors of the compressor 2a and of the turbine 8a respectively, these rotors being both rigid with the shaft 9a.

The spool 36 moves inside a case 39 which comprises four ports 40,41,42 and 43 which respectively communicate with the connection passage 4 (supercharging air at pressure $P_2$), with the transfer passage 12 (exhaust and combustion gases at pressure $P_3$), with the outlet 3a of the compressor 2a, and with the inlet 11a of the turbine 8a. The spool 36 has extending therethrough two apertures 44 and 45 and a longitudinal cavity (or groove) 46 which faces toward the side corresponding to the ports 42 and 43, the ports 40 and 41 being provided on the other side.

The arrangement is such that:
either cavity 46 puts the port 42 in communication with the port 43, i.e. the outlet 3a of the compressor 2a in communication with the inlet 11a of the turbine 8a, the apertures 44 and 45 being located in front of solid parts of the case 39 (FIG. 3 the position of which corresponds to that of FIG. 1);
or the aperture 44 puts the port 42 in communication with the port 40, i.e. the outlet 3a of the compressor in communication with the connection passage 4 and, moreover, the aperture 45 puts the port 41 in communication with the port 43, i.e. the transfer passage 12 in communication with the inlet 11a of the turbine 8a, the cavity 46 being located in front of solid parts of the case 39 (FIG. 4 the position of which corresponds to that of FIG. 2).

Preferably, the aperture 45 is extended by a cylindrical sleeve 66 which has for purpose both to guide the flow of the hot gases in the turbine 8a by avoiding the bursting of the jet in the cavity 46 and to reduce to a minimum the contact of the hot gases with the mechanical parts of the spool 36. When this spool is in the bypassing position (FIG. 3) and the spool, under the effect of the pressure $P_2$ and $P_3$, bears against the side 67 of the case 39 adjacent the turbine 8a, the sleeve 66 also bears against this side and opposes any escape of air ($P_2$) or gas ($P_3$) to the cavity 46 and subsequently to the atmosphere by way of the inoperative turbocharger 10a. The pressure drop which is created by the throttle means 18 and which serves to scavenge the engine 1 ($P_2$ being higher than $P_3$) also serves to scavenge the four-way directional valve 35 with fresh air which precludes any reflux of gas in the mechanism so as to oppose the soiling and facilitate the cooling thereof. Note that the sleeve 66 would have the same advantages with a directional valve having a rotary dome.

Preferably, the four-way directional valve 35 (having a spool or dome), or the two three-way valves 33,34 are controlled by a system 57 (FIG. 3) capable of measuring the speed of the engine 1 and producing an electric control signal when the speed of the motor 1 passes through substantially the same threshold value N when accelerating and decelerating.

Further, preferably the means responsive to the speed of the engine 1 are combined with a starter system which may be of the electric or hydraulic type (Pelton wheel) but which is preferably of the type employing a compressed air jet known under the name "jet assistance". Such a system, which is diagrammatically shown at 47a in FIG. 3, is operative to direct onto the blades of the impeller 37a of the compressor 2a an air jet which is so oriented as to initiate the rotation in the suitable direction of the whole of this compressor 2a and the turbine 8a associated therewith.

For this purpose, a bottle of compressed air (for example at 40 bars) 48 may be connected through an electrically operated valve 49 and a pressure relief valve 68 directly to the starter system 47a and through an orifice 50, to one of the sides of the piston 51 of a double-acting cylinder device 52. This piston 51 is connected by a rod 53 to the spool 36 and may be connected on its other side by a three-way electrically operated valve 54 to a pipe 55 of oil under pressure or to a low-pressure return circuit 69 through a calibrated orifice 56. The two electrically operated valves 49 and 54 are controlled by the system 57.

In the position of FIG. 3 in which the turbocharger unit 10a is inoperative and where the valve 54 is in a position putting the pipe 55 of oil under pressure in communication with the bottom of the piston 51, when the system 57 detects that the speed of the engine 1 exceeds a critical threshold value, it sends a signal to the valves 49 and 54. This signal causes the valve 49 to put the compressed air bottle 48 in communication with both the starter system 47a, which immediately acts on the impeller 37a of the compressor 2a, and with the top of the piston 51. At the same time, the valve 54 is in a position which puts the bottom of the piston 51 in communication with the rerturn circuit 69 through the calibrated orifice 56. Consequently, the piston 51 shifts the spool 36 to the position of FIG. 4 with such delay that the turbocharger unit 10a is started up at the moment its turbine 8a starts to receive the hot gases, when the spool 36 reaches the position of FIG. 4. The electrically operated valve 49 is thereafter closed and it is air, taken from the discharge side of the compressor 2a through the orifice 47a, which maintains the upper side of the piston 51 under pressure (as diagrammatically shown by the arrows in dot-dash lines in FIG. 3).

When starting in the position shown in FIG. 4 in which the turbocharger unit 10a is operating and the system 57 detects that the speed of the engine 1 drops below the critical threshold value, this system 57 sends a signal to the electrically operated valve 54 which assumes a position which puts the pipe 55 of oil under pressure again in communication with the bottom of the piston 51, the assembly then resuming the position of FIG. 3.

Figure 5:
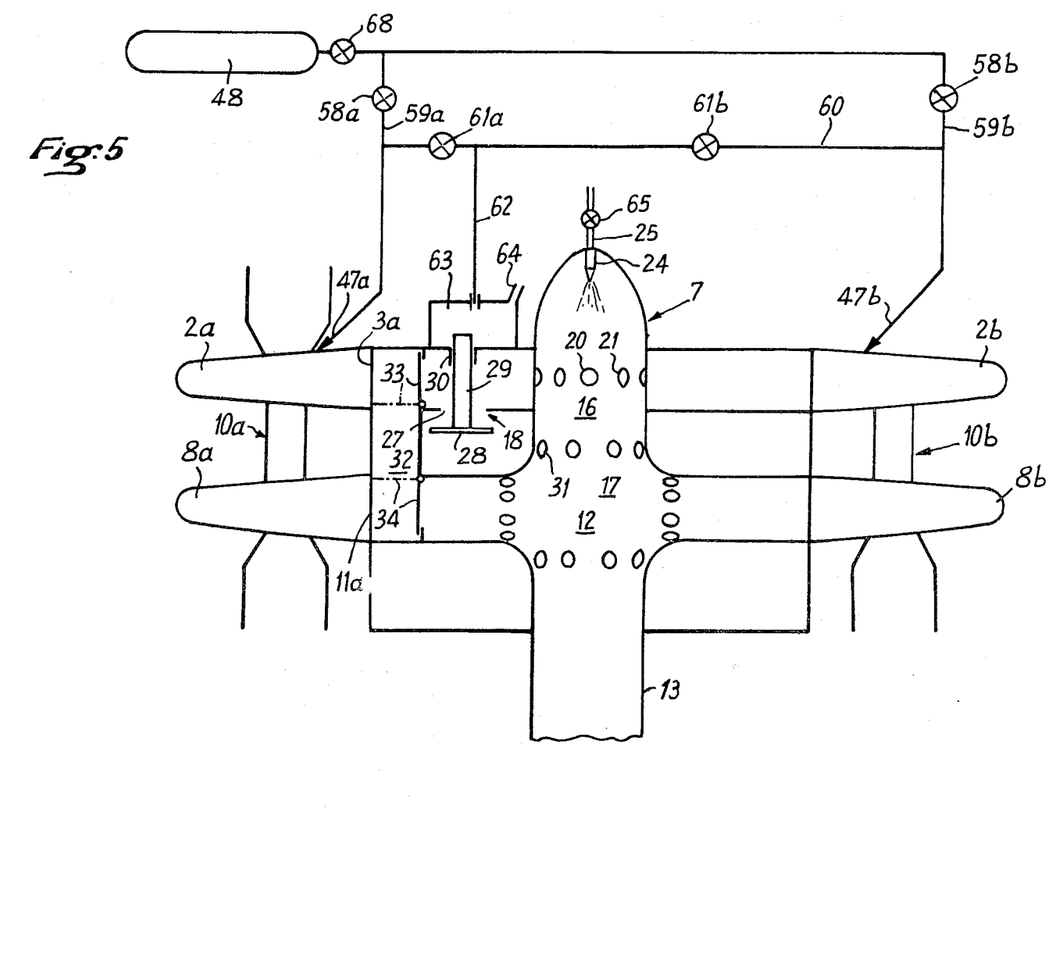
FIG. 5 illustrates the method for starting up and regulating the speed of an engine according to the invention.

The method for starting up and regulating the speed of the engine 1 will now be described with reference to FIG. 5 which reproduces the essential elements of FIGS. 1, 2 and 3. The compressor 2b comprises a starter system 47b similar to the system 47a of the compressor 2a.

Two electrically operated valves 58a and 58b are inserted in two pipes 59a and 59b connecting the compressed air cylinder 48 to the two starter systems 47a and 47b respectively. An auxiliary pipe 60 interconnects the parts of the pipes 59a and 59b which are downstream of the valves 58a and 58b respectively. This auxiliary pipe 60 is provided with two electrically operated valves 61a and 61b between which a pipe 62 extends from the pipe 60. The pipe 62 leads to a chamber 63 into which extends the upper part of the piston 29, this chamber 63 being connected to the surrounding free air by way of a calibrated escape orifice 64. An electrically operated valve 65 is inserted in the fuel pipe 25 which supplies fuel to the auxiliary combustion chamber 7.

When the engine 1 is not operating, the electrically operated valves 58a and 58b are closed. Before starting up the engine 1, the directional valve 36 is placed in the position corresponding to FIG. 3 and puts the rear side of the piston 51 in communication with the pressurized oil pipe 55 owing to the action of the electrically operated valve 54, and then the rotation of the turbocharger unit 10b is initiated by leaving the valve 58a closed and opening the valve 58b so that the starter system 47b blows compressed air onto the blades of the impeller of the compressor 2b. By rotating, the latter sends air to the primary zone 16 of the auxiliary combustion chamber 7 by way of the orifices 20,21 and to the secondary zone 17 by way of the orifices 31. When the valve 61b is opened, compressed air is sent into the chamber 63 which is put under pressure owing to the action of the calibrated orifice 64. The orifice 64 must be so determined that the throttle means 18 are fully opened so as to provide the bypass passage 6 with its largest section during the starting of the turbocharger unit 10b. When the valve 61b (or 61a) is again closed, the chamber 63 resumes atmospheric pressure through the orifice 64 and the throttle means 18 resume their normal regulation in accordance with the aforementioned relation (I). At the same time as the electrically operated valve 58b, the electrically operated valve 61b is opened so as to send compressed air into the chamber 63 and thereby open the valve 27, 28, and the electrically operated valve 65 is opened so that the injector or injectors 24 deliver a fuel flow which is sufficient to ensure independent operation of the turbocharger unit 10b at the same time as the auxiliary combustion chamber 7 is ignited. As soon as the turbocharger unit 10b rotates independently, the electrically operated valve 58b is closed.

Then the engine 1 is started up and the engine aspirates the air discharged by the compressor 2b and is accelerated to its cruising speed (lower than the critical threshold value defined hereinbefore).

If the system 57 (FIG. 3) detects that the speed of the engine 1 exceeds its critical threshold value, the electrically operated valve 58a is opened so as to ensure that the speed, and consequently the pressure, of the turbocharger unit 10a is increased. When a certain pressure is established by the turbocharger 10a, the latter is put into circuit by shifting the spool 36 from the position of FIG. 3 to that of FIG. 4. As fresh air is sent to the bypass pipe 6 by this turbocharger unit, the auxiliary combustion chamber 7 delivers the additional energy to the turbine 8a at the same time as the electrically operated valve 58 is closed. The motor 1 is charged to its normal speed.

In order to return to the cruising speed, the turbocharger unit 10a is isolated by shifting the spool 36 from the position of FIG. 4 to that of FIG. 3.

In order to stop the engine 1 the supply of fuel to the engine and to the auxiliary combustion chamber 7 is stopped.

Figure 6:
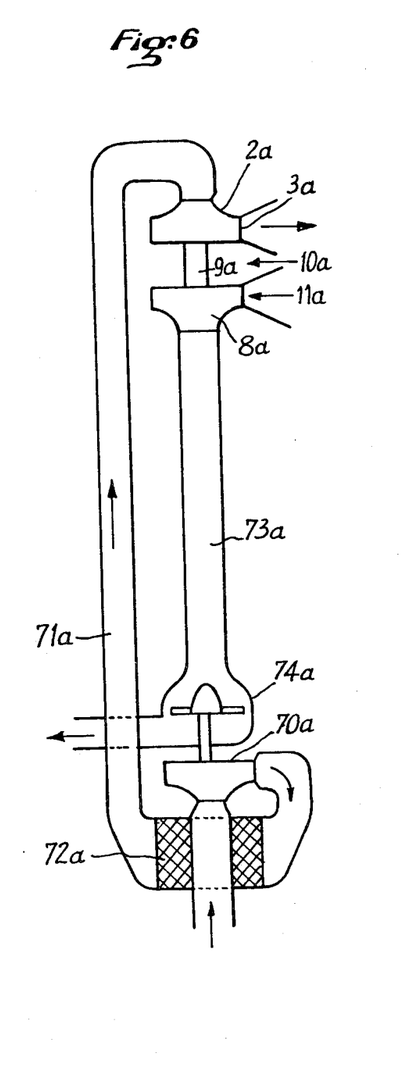
FIG. 6 represents a modification of a detail of the engine of FIGS. 1 and 2.

It must be understood that the scope of the invention is not intended to be limited to the embodiments described hereinbefore. In particular, instead of being of one stage, each turbocharger unit 10a, 10b may constitute the second stage of a turbocharger unit as diagrammatically shown in FIG. 6 in respect of the turbocharger unit 10a. The first stage comprises a compressor 70a whose discharge pipe 71a, which is provided with an intermediate cooler 72a, is connected to the inlet of the compressor 2a. The outlet of the turbine 8a is connected by a pipe 73a to the inlet of a turbine 74a which mechanically drives the compressor 70a and forms with the latter the first stage.

Further, the directional valve 35, or the valves 33,34, may be actuated not as a function of the speed of the engine 1 but as a function of another parameter of operation of the engine, examples of which were given hereinbefore.

While the invention is of particular interest when the engine 1 comprises a bypass passage 6 having an auxiliary combustion chamber 7, these elements 6 and 7 are not essential to the carrying out of the invention.

Having now described our invention what we claim as new and desire to secure by Letters Patent is:

1. In a supercharged internal combustion engine comprising air intake means and exhaust means, at least two compressors having outlets which are capable of being connected in parallel through a common connection passage to said air intake means, a plurality of turbines each mechanically drivingly connected to an associated one of said compressors to form therewith a turbocharger unit, said turbines having inlets which are capable of being connected in parallel through a common transfer passage to said exhaust means, means which are responsive to a parameter of operation of the engine which represents a ratio between the air flow through the engine and the total air flow discharged by said compressors and are arranged to selectively interrupt and ensure communication between the outlet of the compressor of one of said turbocharger units and said connection passage and between the inlet of the turbine of said one turbocharger unit and said transfer passage in accordance with the value of said parameter; the improvement comprising bypass means between said compressor outlet and said turbine inlet of said one turbocharger unit, and valve means cooperative with said bypass means and associated with said parameter responsive means so as to be controlled by said parameter responsive means in such manner that at the same time as said parameter responsive means interrupt said communication with said outlet of said compressor and with said inlet of said turbine of said one turbocharger, said parameter responsive means also directly connect through said bypass means said outlet of said compressor to said inlet of said turbine of said one turbocharger unit and, inversely at the same time as said parameter responsive means ensure said communication, said parameter responsive means interrupt said connection through said bypass means of said outlet of said compressor to said inlet of said turbine of said one turbocharger unit.

2. An internal combustion engine according to claim 1, wherein a bypass passage provided with an auxiliary combustion chamber connects said common connection passage to said common transfer passage by bypassing the engine.

3. An internal combustion engine according to claim 1, comprising only two turbocharger units.

4. An internal combustion engine according to claim 2, comprising only two turbocharger units.

5. An internal combustion engine according to claim 3, wherein said two turbocharger units are identical.

6. An internal combustion engine according to claim 2, wherein said auxiliary combustion chamber comprises a primary zone in an upstream port of said combustion chamber and a secondary zone for diluting combustion gases and located downstream of said primary zone, said bypass passage is divided into two main branches, a first of which branches leads to said secondary zone and is provided with first throttle means defining a variable passage section, whereas a second of said branches extends from a region of said first branch located upstream of said first throttle means and opens into said primary zone through second throttle means, said first throttle means being operative to create a pressure drop which is substantially independent of the ratio between the air flow in said bypass passage and the total air flow discharged by said compressor or compressors but which varies in the same direction as the pressure prevailing upstream of said first throttle means, means being provided for correlatively varying the flow of fuel and the flow of air introduced in said primary zone.

7. An internal combustion engine according to claim 6, comprising only two turbocharger units.

8. An internal combustion engine according to claim 7, wherein said two turbocharger units are identical.

9. An internal combustion engine according to claim 1, wherein said means responsive to a parameter of operation of the engine comprise four-way directional valve means between said outlet of said compressor of said one turbocharger unit, said inlet of said turbine of said one turbocharger unit, said connection passage and said transfer passage.

10. An internal combustion engine according to claim 1, wherein said parameter of operation of the engine is the running speed of the engine, and said means responsive to the speed of the engine are operative to act approximately at the same speed threshold of the engine and as rapidly as possible when said means responsive to the speed of the engine interrupt and ensure said communication.

11. An internal combustion engine according to claim 1, wherein said means responsive to a parameter of operation of the engine are combined with a starter system which is associated with said one turbocharger unit which is capable of being put out of operation so as to put said starter system in operation before ensuring said communication between said outlet of said compressor of said one turbocharger unit and said connection passage and said communication between said inlet of said turbine of said one turbocharger unit and said transfer passage.

12. An internal combustion engine according to claim 11, wherein said starter system comprises means producing a compressed air jet.

13. An internal combustion engine according to claim 9, wherein said directional valve means comprise a case and an element movable relative to said case, said case has on one side thereof a first port communicating with said connection passage and a second port communicating with said transfer passage and, on another side of said case, a third port communicating with said outlet of said compressor of said one turbocharger unit and a fourth port communicating with said inlet of said turbine of said one turbocharger unit, said movable element defines a first aperture extending through said movable element for putting said first port in communication with said third port and a second aperture extending through said movable element for putting said second port in communication with said fourth port, said movable element further defines a cavity capable of creating said bypass means between said third port and said fourth port, and said second aperture is extended inside said cavity by a sleeve which is capable of bearing by a free end thereof against the corresponding side of said case.

14. An internal combustion engine according to claim 5, wherein said means responsive to a parameter of operation of the engine comprise four-way directional valve means between said outlet of said compressor of said one turbocharger unit, said inlet of said turbine of said one turbocharger unit, said connection passage and said transfer passage.

15. An internal combustion engine according to claim 6, wherein said means responsive to a parameter of operation of the engine comprise four-way directional valve means between said outlet of said compressor of said one turbocharger unit, said inlet of said turbine of said one turbocharger unit, said connection passage and said transfer passage.

16. An internal combustion engine according to claim 8, wherein said means responsive to a parameter of operation of the engine comprise four-way directional valve means between said outlet of said compressor of said one turbocharger unit, said inlet of said turbine of said one turbocharger unit, said connection passage and said transfer passage.

17. An internal combustion engine according to claim 5, wherein said parameter of operation of the engine is the running speed of the engine, and said means responsive to the speed of the engine are operative to act approximately at the same speed threshold of the engine and as rapidly as possible when said means responsive to the speed of the engine interrupt and ensure said communication.

18. An internal combustion engine according to claim 6, wherein said parameter of operation of the engine is the running speed of the engine, and said means responsive to the speed of the engine are operative to act approximately at the same speed threshold of the engine and as rapidly as possible when said means responsive to the speed of the engine interrupt and ensure said communication.

19. An internal combustion engine according to claim 8, wherein said parameter of operation of the engine is the running speed of the engine, and said means responsive to the speed of the engine are operative to act approximately at the same speed threshold of the engine and as rapidly as possible when said means responsive to the speed of the engine interrupt and ensure said communication.

20. An internal combustion engine according to claim 5, wherein said means responsive to a parameter of operation of the engine are combined with a starter system which is associated with said one turbocharger unit which is capable of being put out of operation so as to put said starter system in operation before ensuring said communication between said outlet of said compressor of said one turbocharger unit and said connection passage and said communication between said inlet of said turbine of said one turbocharger unit and said transfer passage.

21. An internal combustion engine according to claim 6, wherein said means responsive to a parameter of operation of the engine are combined with a starter system which is associated with said one turbocharger unit which is capable of being put out of operation so as to put said starter system in operation before ensuring said communication between said outlet of said compressor of said one turbocharger unit and said connection passage and said communication between said inlet of said turbine of said one turbocharger unit and said transfer passage.

22. An internal combustion engine according to claim 8, wherein said means responsive to a parameter of operation of the engine are combined with a starter system which is associated with said one turbocharger unit which is capable of being put out of operation so as to put said starter system in operation before ensuring said communication between said outlet of said compressor of said one turbocharger unit and said connection passage and said communication between said inlet of said turbine of said one turbocharger unit and said transfer passage.

23. A method for starting up and regulating the speed of a supercharged internal combustion engine which comprises air intake means and exhaust means, a bypass passage comprising an auxiliary combustion chamber, at least two compressors having outlets which are capable of being connected in parallel through a common connection passage to said air intake means and to said bypass passage, a plurality of turbines each of mechanically drivingly connected to an associated one of said compressors to form therewith a turbocharger unit, said turbines having inlets which are capable of being connected in parallel through a common transfer passage to said exhaust means and to an outlet of said auxiliary combustion chamber, said method comprising, when starting up the engine, initiating rotation of a first of said turbocharger units after having bypassed a second of said units by connecting the outlet of the compressor of said second unit to the inlet of the turbine thereof at the same time as sending fuel to and igniting the fuel in the auxiliary combustion chamber in an amount sufficient to ensure independent operation of said first turbocharger unit at a discharge pressure of the compressor thereof which is sufficient to permit the starting up of the engine having regard to the volumetric ratio of the engine;

then starting up the engine and accelerating the engine until the ratio between the air flow through the engine and the total air flow discharged by the compressors reaches a ratio threshold of given value;

then, from the moment when said ratio threshold value is reached and exceeded during a minimum lapse of time, initiating rotation of said second turbocharger unit and, as soon as the speed of rotation or the discharge pressure thereof reaches a first given threshold of operation, reestablishing the normal communications of said second turbocharger unit and charging the engine;

then, when the threshold of operation is passed through in the opposite direction, bypassing as rapidly as possible said second turbocharger unit and allowing the engine to operate supercharged by said first turbocharger unit.

24. A method according to claim 23, for starting up and regulating the speed of an engine in which said bypass passage is divided into two main branches, a first of which branches leads to a secondary zone for diluting combustion gases and located downstream of a primary zone in an upstream part of the auxiliary combustion chamber, said first branch being provided with first throttle means defining a variable passage section, a second of said branches extending from a region of said first branch which is located upstream of said first throttle means and opens into said primary zone through second section throttling means, said first throttle means being operative to create a pressure drop which is substantially independent of the ratio between the air flow in said bypass passage and the total air flow discharged by said compressor or compressors but which varies in the same direction as the pressure prevailing upstream of said first throttle means, wherein, each time a rotation of a turbocharger unit is initiated, said first throttle means are made to occupy temporarily a fully open position thereof.

* * * * *